US011360973B2

(12) United States Patent
Bolshinsky et al.

(10) Patent No.: US 11,360,973 B2
(45) Date of Patent: *Jun. 14, 2022

(54) GENERATING MULTILINGUAL QUERIES

(71) Applicant: International Business Machines Corporation, Armonk, NY (US)

(72) Inventors: Leonid Bolshinsky, Karmiel (IL); Vladimir Gamaley, Rehovot (IL); Sharon Krisher, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 512 days.

This patent is subject to a terminal disclaimer.

(21) Appl. No.: 16/531,154

(22) Filed: Aug. 5, 2019

(65) Prior Publication Data

US 2019/0354525 A1 Nov. 21, 2019

Related U.S. Application Data

(63) Continuation of application No. 14/707,108, filed on May 8, 2015.

(51) Int. Cl.
*G06F 16/2452* (2019.01)
*G06F 16/242* (2019.01)

(52) U.S. Cl.
CPC ...... *G06F 16/24522* (2019.01); *G06F 16/243* (2019.01)

(58) Field of Classification Search
CPC .................. G06F 16/24522; G06F 16/243
See application file for complete search history.

(56) References Cited

U.S. PATENT DOCUMENTS 7,890,493 B2 2/2011 Chen
8,375,025 B1 2/2013 Datar
(Continued)

FOREIGN PATENT DOCUMENTS

EP 2682875 A1 1/2014
WO 2012174741 A1 12/2012

OTHER PUBLICATIONS

Mell et al., "The NIST Definition of Cloud Computing", Recommendations of the National Institute of Standards and Technology, Special Publication 800-145, Sep. 2011, 7 pages.
(Continued)

*Primary Examiner* — William B Partridge
*Assistant Examiner* — Aryan D Toughiry
(74) *Attorney, Agent, or Firm* — Stephanie L. Carusillo (57) ABSTRACT

Examples of techniques for performing multilingual queries are described herein. A computer-implemented method includes monitoring, via a processor, a client for language settings during user-generated content creation and detect one or more language settings. The method includes analyzing user-created content to detect a language of a text. The method includes compiling a list of scored preferred languages for the client based on the detected language settings and the detected language of the text. The method includes intercepting a query from the client. The method includes analyzing a text of the intercepted query in a plurality of selected languages based on a language setting of a user interface application, a detected language of the query, and a predetermined number of preferred languages of the client to produce results of analysis for each selected language. The method includes generating a multilingual query based on results of analysis for the selected languages.

20 Claims, 6 Drawing Sheets

(56) References Cited

U.S. PATENT DOCUMENTS

| | | |
|---|---|---|
| 8,442,965 B2 | 5/2013 | Lopiano |
| 8,560,466 B2 | 10/2013 | Diao |
| 8,762,358 B2 | 6/2014 | Datta |
| 2004/0122656 A1 | 6/2004 | Abir |
| 2006/0149716 A1 | 7/2006 | Polo-Malouvier |
| 2008/0249998 A1 | 10/2008 | Dettinger |
| 2013/0060748 A1 | 3/2013 | Bennett |
| 2013/0339378 A1 | 12/2013 | Zheng |
| 2016/0328399 A1 | 11/2016 | Bolshinsky et al. |
| 2016/0328468 A1 | 11/2016 | Bolshinsky et al. |

OTHER PUBLICATIONS

IBM, "List of Applications Treated as Related", Appendix P, Filed Herewith, 2 pages.

GENERATING MULTILINGUAL QUERIES

BACKGROUND

The present techniques relate to query analysis, and more specifically, to generating multilingual queries.

SUMMARY

According to an embodiment described herein, a system can include a processor. The processor can detect one or more language settings during user-generated content creation and detect one or more language settings. The processor can analyze the user-created content to detect a language corresponding to text in the user-generated content. The processor can also further compile a list of preferred languages for a client based on the detected language settings and the detected language of the text, each preferred language having a language score calculated based on an amount of content produced in the preferred language. The processor can further intercept a query from the client. The processor can also further generate a multilingual query based on the one or more language settings, a detected language of the intercepted query, and the list of preferred languages. The processor can also further display a list of multilingual query results from the multilingual query.

According to another embodiment described herein, a computer-implemented method can include monitoring, via a processor, a client for language settings during user-generated content creation and detect one or more language settings. The computer-implemented method can include analyzing, via the processor, user-created content to detect a language from a text of the user-generated content. The computer-implemented method can further include compiling, via the processor, a list of scored preferred languages for the client based on the detected language settings and the detected language of the text. The computer-implemented method can also include intercepting, via the processor, a query from the client. The computer-implemented method can also further include analyzing, via the processor, a text of the intercepted query in a plurality of selected languages based on a language setting of a user interface application, a detected language of the query, and a predetermined number of preferred languages of the client to produce results of analysis for each selected language. The computer-implemented method can also include generating, via the processor, a multilingual query based on the results of analysis for the selected languages.

According to another embodiment described herein, a computer program product for multilingual queries can include computer-readable storage medium having program code embodied therewith. The computer readable storage medium is not a transitory signal per se. The program code can be executable by a processor to cause the processor to monitor a client for language settings during user-generated content creation and detect one or more language settings. The program code can also cause the processor to analyze user-created content to detect a language from a text of the user-generated content. The program code can also cause the processor to compile a list of scored preferred languages for a client based on the detected language settings and the detected language of the text, each preferred language having a language score calculated based on an amount of content produced in the language. The program code can also cause the processor to intercept a query from the client. The program code can also cause the processor to analyze a text of the intercepted query in a plurality of selected languages based on a language setting of a user interface application and a predetermined number of preferred languages for the client to produce results of analysis for each selected language. The program code can also cause the processor to generate a multilingual query based on the results of analysis for the selected languages. The program code can also cause the processor to display a list of multilingual query results in the selected languages.

DETAILED DESCRIPTION

In modern computer systems that incorporate search capabilities, it is helpful to correctly determine the language of a user's query or the set of languages the user might be interested in searching. In some examples, a search engine can use morphological analysis of a user's search query to determine languages that a user might be interested in searching. Morphological analysis, as used herein, refers to the analysis of the structure of a given language's morphemes and other linguistic units, such as base forms, root words, affixes, parts of speech, intonations and stresses, or implied context, among others. For example, the same word written with Latin characters can have different base forms in two different European languages as well as different meanings. The rules for a morphological analysis can be different for every language. Based on the detected languages from morphological analysis, the search engine can correctly find documents that contain words which do not appear in the user's query, but have the same base form as the words in the user's query. A base form, as used herein, can refer to the primary lexical unit of a word family.

However, morphological analyses performed solely based on a submitted query do not always produce accurate results. For example, a query may only have two or three words and include typos or incomplete words. Such a limited sample for analysis may produce a limited, if not incorrect, set of languages for possible results that may be of interest to a user. In addition, although the language in a browser's settings may be used, such language may not necessarily be familiar to the user. For example, users may often use a variety of locales such as US English (EN_US) or British English (EN_UK) as a language setting in a browser while performing a query in Spanish because most of the characters are very similar. Moreover, the language character setting of a browser is generally limited to only one language at any time.

According to embodiments of the present disclosure, multilingual queries can be generated based in part on languages used to produce user-generated content. A client can be monitored for language settings during sessions when user-generated content is produced. User-generated content provided from the client can also be analyzed to detect one or more languages from the text of the user-generated content. The detected language settings and detected language of the user-generated content text can be used to compile a list of scored preferred languages associated with a user of the client. When a user submits a query via an application, the query can be intercepted by the application. The text of the intercepted query can then be analyzed in a plurality of languages. For example, a predetermined number of languages can be selected from the list of preferred languages and the language setting of the application. Based on the results of this analysis, a multilingual query can be generated and submitted to a search engine. After the results are returned from the search engine, the multilingual query results can be displayed at the client. In some examples, boost factors based on the scores of the selected languages can also be applied to the results to affect their order. As used herein, a boost factor refers to a predetermined weight given to rankings based on factors such as language score, among other factors. Thus, a potential advantage of the present techniques is that they can produce better quality multilingual search results that include content in languages in which a user is highly likely to be proficient. Moreover, in another potential advantage of the present techniques, by boosting query results according to their language score, the techniques enable a user to find relevant search results more efficiently. It is to be understood that some embodiments of the present techniques may not have these potential advantages and that these potential advantages are not necessarily required of all embodiments.

In some scenarios, the techniques described herein may be implemented in a cloud computing environment. As discussed in more detail below in reference to at least FIGS. 1, 3, and 4, a computing device configured to generate multilingual queries may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
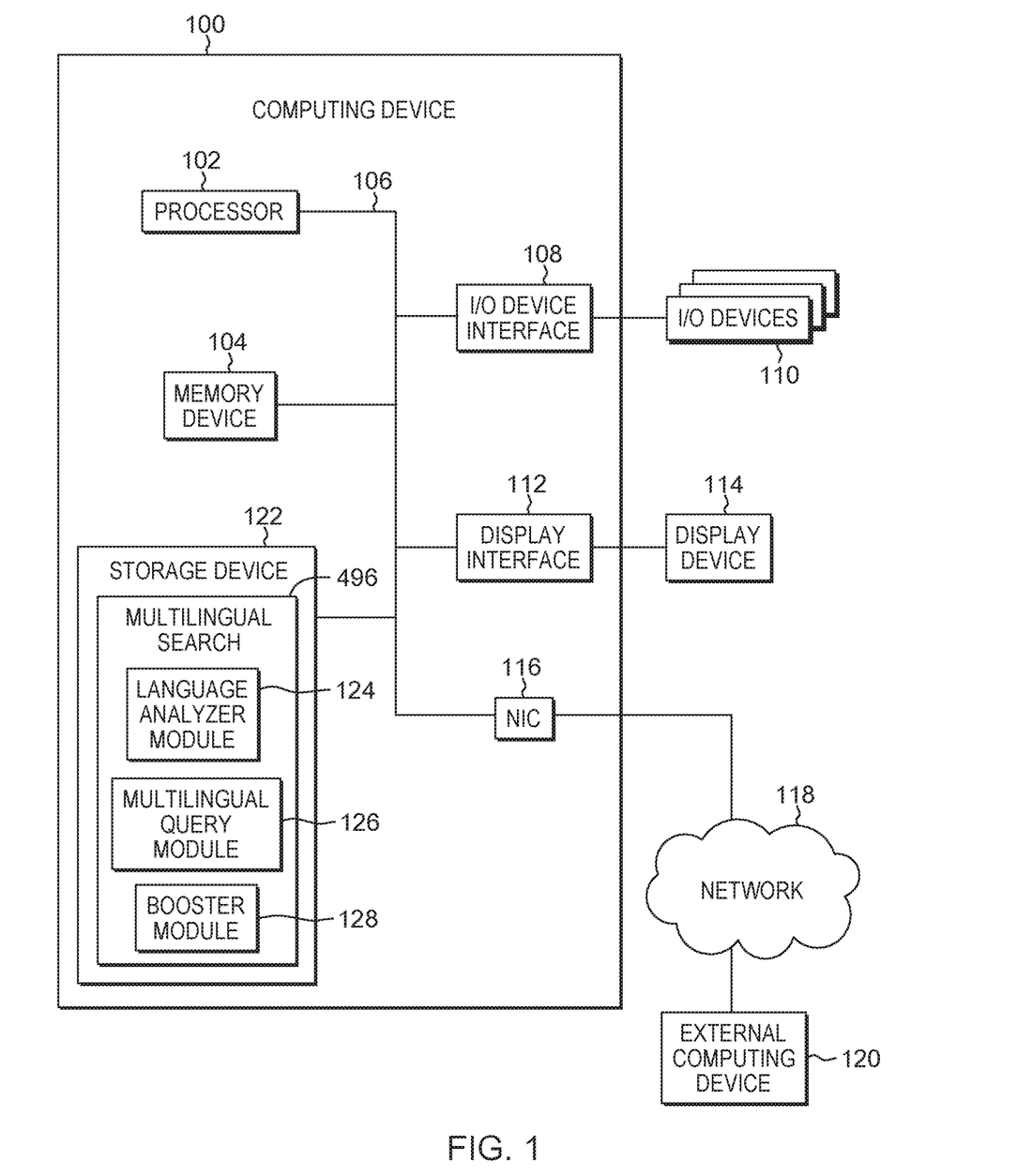
FIG. 1 is block diagram of an example computing device that can generate multilingual queries.

With reference now to FIG. 1, an example computing device can generate multilingual queries. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external web-server 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include a language analyzer module 124, a multilingual query module 126, and a booster module 128. In some examples, the language analyzer module 124 can monitor a client for language settings during user-generated content creation and detect one or more language settings. In some examples, the user-generated content can be long content. For example, long content can include wiki pages, blog posts, and web articles that are created or edited. In some examples, user-generated content can include content signed by a user. For example, an electronic signature may be used to indicate authorship of content. The language analyzer module 124 can also analyze user-created content to detect a language of a text. The language analyzer module 124 can also compile a list of scored preferred languages for the client based on the detected language settings and the detected language of the text, each preferred language having a language score calculated based on an amount of content produced in the language.

The multilingual query module 126 can then intercept a query from the client. For example, the query can be one or more words of text in any language or character set. In some examples, the query can be a web search query that includes plain text or hypertext with any number of search directives. The multilingual query module 126 can also analyze text of the intercepted query in a plurality of selected languages based on a language setting of a user interface application, a detected language of the intercepted query, and a predetermined number of preferred languages of the client to produce results of analysis for each selected language. In some embodiments, the user interface application may be a browser. The language setting of the browser can thus be used as one of the languages for analyzing the query text. For example, the predetermined number of preferred languages can be initially set at zero. The text of the intercepted query can then be analyzed based on the language setting of the user interface application and the detected language of the intercepted query. The multilingual query module 126 can further generate a multilingual query based on results of analysis for the selected languages. In some examples, the selected languages can include one or more of the preferred languages of the client if the query generated using the language setting of the user interface application and the detected query text language return less than a threshold number of query results. The processor can then generate a second multilingual query based upon the results of analysis for the additional selected languages. The booster module 128 can then display a list of multilingual query results in the selected languages. In some examples, the booster module 128 can apply boost factors to the results of the multilingual query based on the language scores of the selected languages. For example, multilingual query results in languages that have higher language scores may be ranked higher than results that have the same relevance or popularity, but have lower language scores. In some examples, the multilingual query results may be grouped by languages, and ranked according to their respective language scores.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the language analyzer module 124, multilingual query module 126, and booster module 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the language analyzer module 124, multilingual query module 126, and booster module 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
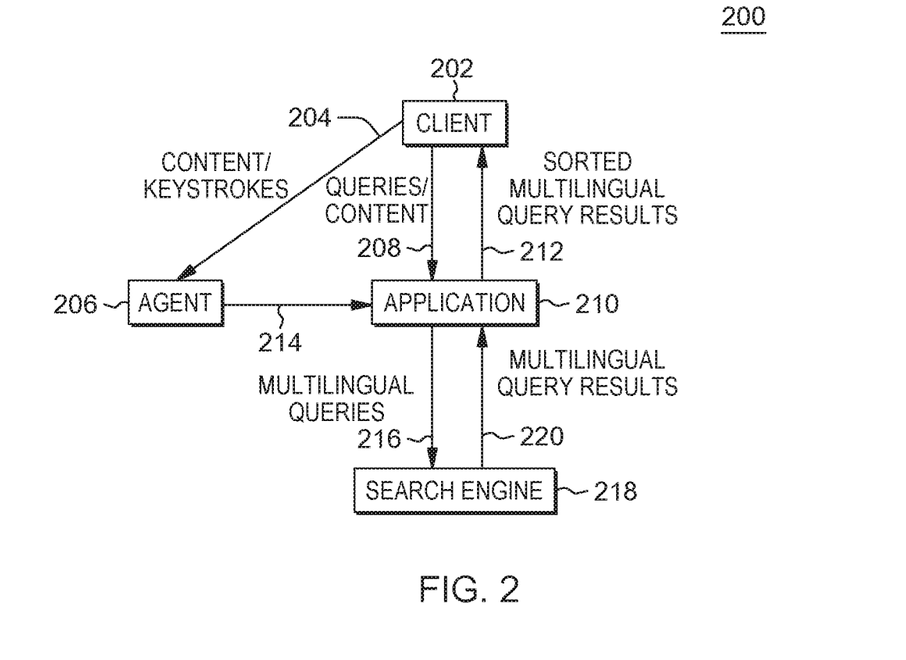
FIG. 2 is a block diagram of an example system that can generate multilingual queries.

FIG. 2 is a block diagram of an example system that can generate multilingual queries. The example system of FIG. 2 is generally referred to by the reference number 200.

FIG. 2 includes a client 202 that is communicatively coupled to an agent 206 as indicated by an arrow 204. The client 202 also can contain an application 210 as indicated by arrows 208 and 212. The application 210 is thus also communicatively coupled to agent 206 as indicated by arrow 214. The application 210 is also communicatively coupled to a search engine 218 as indicated by arrows 216 and 220.

As shown in FIG. 2, an agent 206 can monitor a client 202 for content and/or keystrokes. For example, the client 202 can be a user device or application that a user can use to produce content. In some examples, the agent 206 can be software that is installed on the client device 202. The agent 206 can forward this content to the application 210 for processing. The application 210 can also receive content and/or queries directly from the client 202. For example, the application 210 can be a social network application or any other application in which users provide user-generated content. In some examples, the user generated content can include content that is long content. For example, long content may include wiki pages, blog posts, and web articles that are created and/or edited via the application 210 or detected via the agent 206 as being created and/or edited at the client 202. The user-generated content can also include content that is signed by electronic signatures and the like. In some examples, the user-generated content can include short content such as updates. The application 210 can include code to receive the content and queries from the client 202 and generate multilingual queries based on the language settings of the application 210, detected language of the query, and/or preferred languages as detected from analysis performed on the user-generated content. For example, analysis of user-generated content can produce a list of preferred languages with language scores based on the amount of content written in each language. In some examples, a multilingual query may be generated based on the language setting of the application 210 and the detected language of the query, with additional languages added from the list of preferred languages if the resulting query returns less than a threshold number of results. The languages used in the query may be referred to as selected languages. The selected languages can be used to perform analysis of the intercepted query. For example, a morphological analysis of the intercepted query can be performed using each selected language. Each term in the intercepted query can be translated to a base form in the selected languages. A multilingual query can then be generated based on the results of analysis for the selected languages. For example, the results of each morphological analysis for each selected language can be joined by an "OR" operator to generate a multilingual query. The application 210 then submits 216 the multilingual query to a search engine 218, and receives 220 multilingual query results from the search engine 218.

In some examples, the multilingual query results from the search engine 210 may not have a large number of results. For example, the number of results may be less than a predefined threshold. If the number of results are less than the predefined threshold, then the application 210 can perform analysis on the intercepted query using additional selected languages from the list of preferred languages. The results of this additional analysis can then be used to send an additional query and the results of the additional query combined with the results of the previous query. In some examples, the results of the additional analysis can alternatively be combined with the initial results of analysis and joined by an "OR" operator to produce a multilingual query with a greater number of languages. The results of the multilingual query from the search engine 218 can then again be compared against the threshold for the number of results. Additional selected languages can be added and additional analysis can be performed on the additional selected languages until the query result threshold is met.

In some examples, once a threshold number of query results is achieved, the results can be sorted and ranked by the application 210. For example, the results can be sorted by language. In some examples, the languages can be ranked by their language score. Boost factors can also be applied to results using the language score. The boost factors are described in greater detail in relation to FIG. 5.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional dimensions, or additional indexes, etc.). For example, alternatively, or in addition to the diversity of evidence dimension, strength of the content associations and validity according to date can be used, among other dimensions. Strength of content association can include digital signatures and relative strength of authenticity. Validity according to date can include giving more weight to user-generated content that was created more recently in time.

Figure 3:
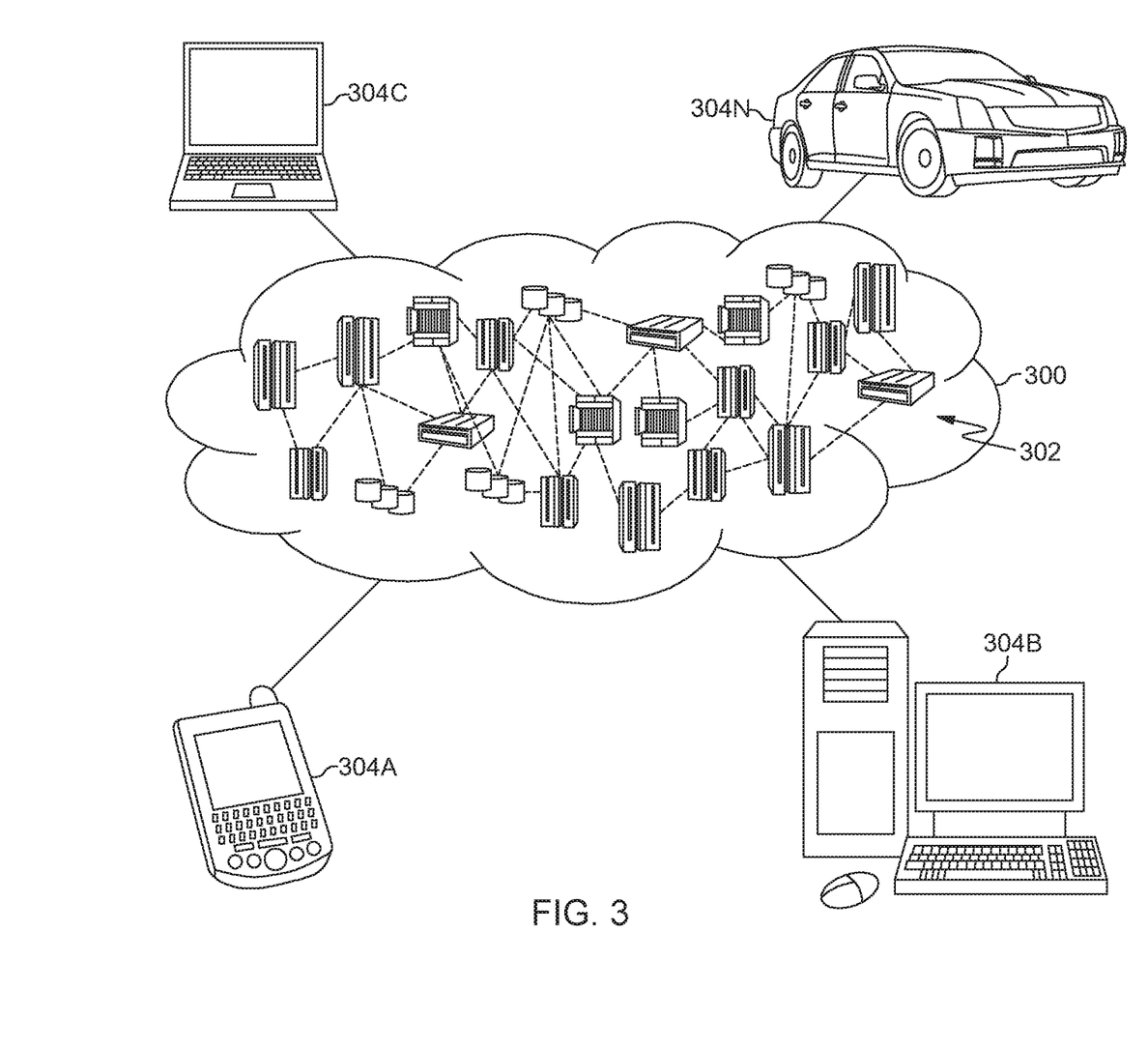
FIG. 3 is an example cloud computing environment according to embodiments described herein.

Referring now to FIG. 3, illustrative cloud computing environment 300 is depicted. As shown, cloud computing environment 300 comprises one or more cloud computing nodes 302 with which local computing devices used by cloud consumers, such as, for example, personal digital assistant (PDA) or cellular telephone 304A, desktop computer 304B, laptop computer 304C, and/or automobile computer system 304N may communicate. Nodes 302 may communicate with one another. They may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 304A-N shown in FIG. 3 are intended to be illustrative only and that computing nodes 302 and cloud computing environment 300 can communicate with any type of computerized device over any type of network and/or network addressable connection (e.g., using a web browser).

Figure 4:
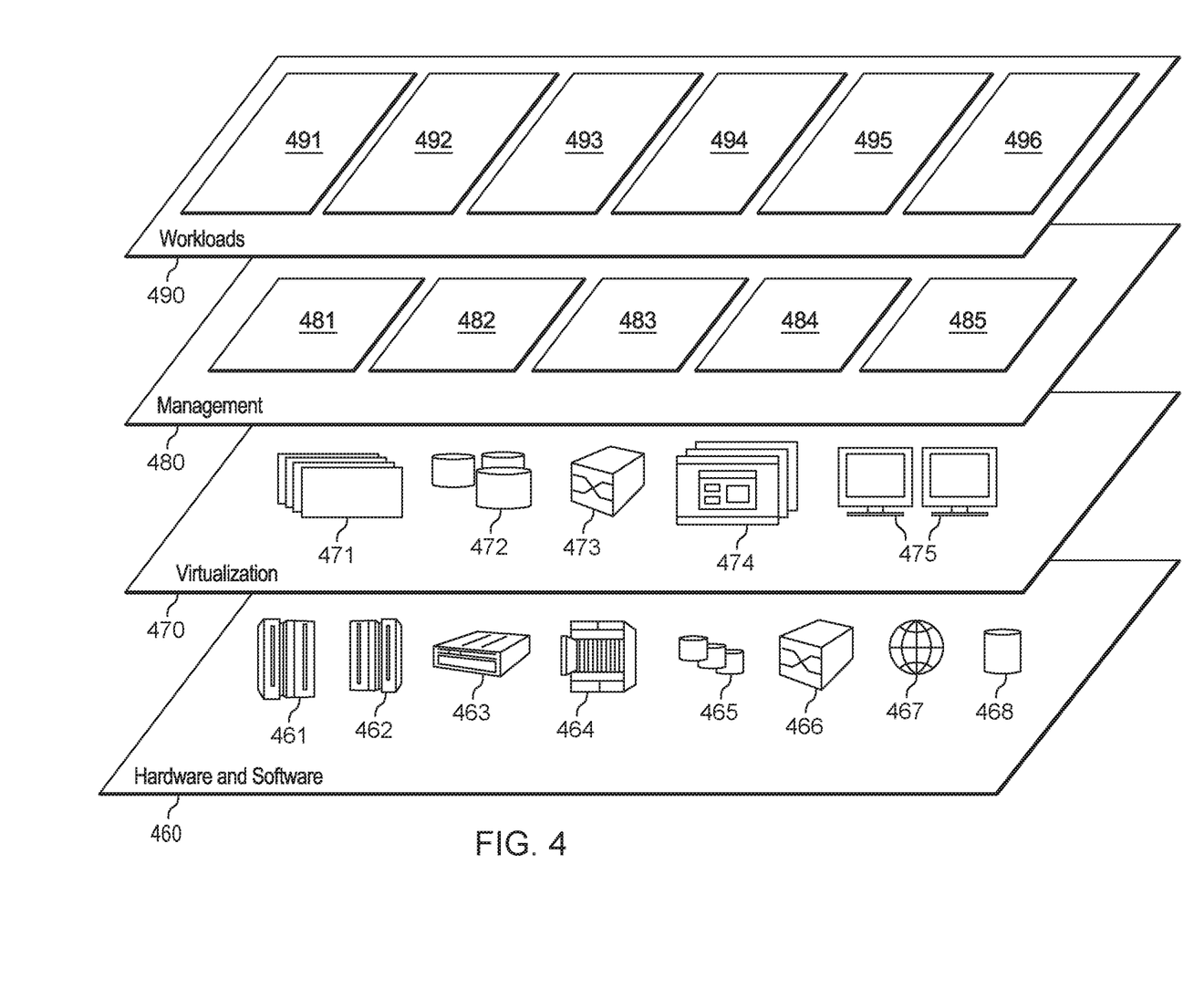
FIG. 4 is example abstraction model layers according to embodiments described herein.

Referring now to FIG. 4, a set of functional abstraction layers provided by cloud computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided.

Hardware and software layer 400 includes hardware and software components. Examples of hardware components include mainframes, in one example IBM® zSeries® systems; RISC (Reduced Instruction Set Computer) architecture based servers, in one example IBM pSeries® systems;

IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 402 provides an abstraction layer from which the following examples of virtual entities may be provided: virtual servers; virtual storage; virtual networks, including virtual private networks; virtual applications and operating systems; and virtual clients. In one example, management layer 404 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 406 provides examples of functionality for which the cloud computing environment may be utilized. Examples of workloads and functions which may be provided from this layer include: mapping and navigation; software development and lifecycle management; virtual classroom education delivery; data analytics processing; transaction processing; and multilingual search.

Figure 5:
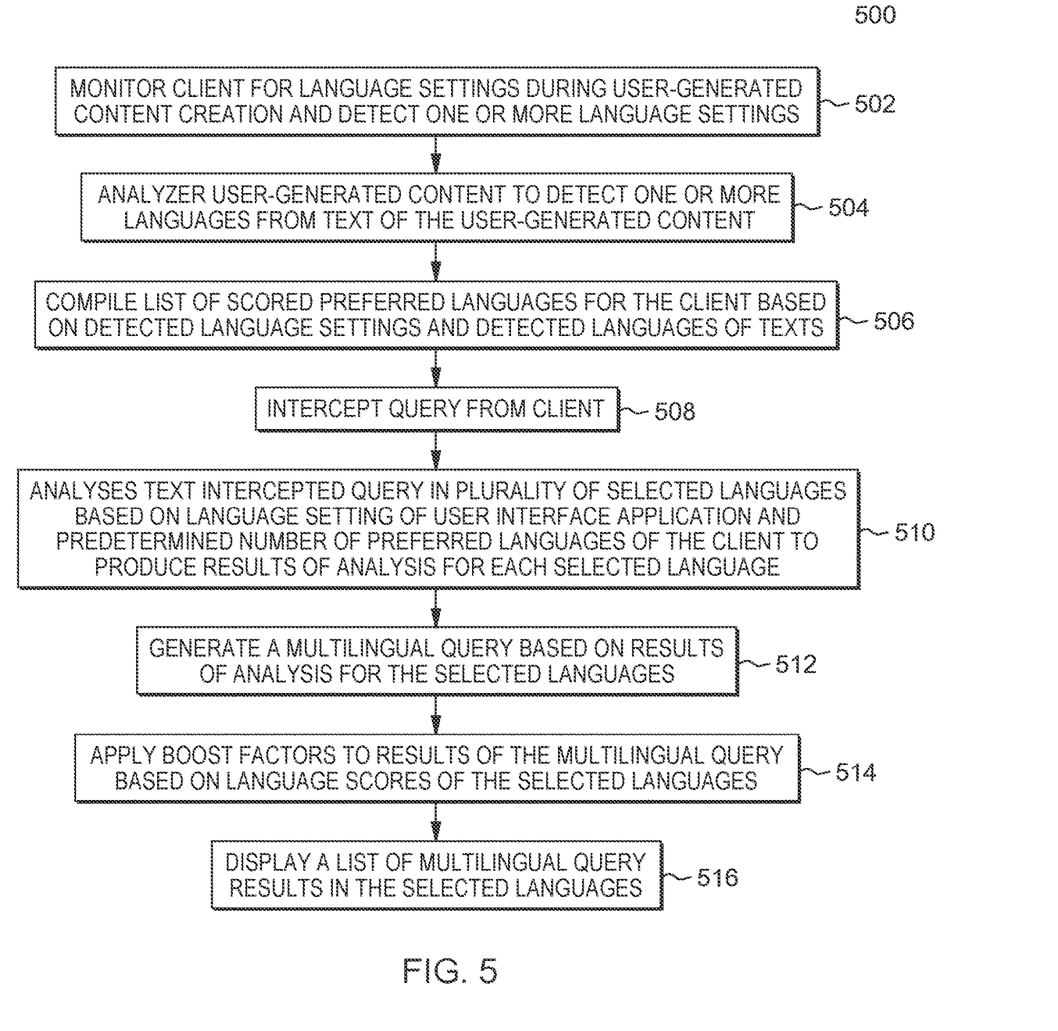
FIG. 5 is a process flow diagram of an example computer-implemented method that can generate multilingual queries.

FIG. 5 is a process flow diagram of an example computer-implemented method for generating multilingual queries. The computer-implemented method 500 can be implemented with any suitable computing device, such as the computing device 100 of FIG. 1 and is described with reference to the system 200 of FIG. 2.

At block 502, the language analyzer module 124 monitors a client for language settings during user-generated content creation and detects one or more language settings. For example, the language settings can be detected from a word processor, a web browser, or any other application used to create content.

At block 504, the language analyzer module 124 analyzes user-created content to detect one or more languages from texts of the user-generated content. For example, any suitable language detection software can be used to detect languages. In some examples, the language analyzer module 124 can also read system language settings and the settings of the system keyboard to detect one or more languages.

At block 506, the language analyzer module 124 compiles a list of scored preferred languages for the client based on detected language settings and detected languages of the texts. For example, a language score can be computed for each of the detected languages of the texts based on the amount of content in each language. The language score can indicate proficiency and usage statistics for a language. The more often the language is used, and the more content that is created using the language, the higher the language score can be. In some examples, the language score for a particular language can be based on how many distinct texts are detected in that language. The detected languages can then be listed by language score in a list of preferred languages for the client.

At block 508, the multilingual query module 126 intercepts a query from the client. For example, the query can be one or more words of text in any language and/or using any character set. In some examples, the query may have been submitted via a browser and the multilingual query module 126 may be a plugin for the browser. The query can be intercepted before it is submitted to a search engine on a server for processing. In some examples, the query may have been submitted via an application such as a social networking application, among others. The query may be intercepted at the client before the query is sent to a social networking server for processing. For example, the multilingual query module 126 can be a module added to the social networking application. In some examples, the query can also be intercepted at a server and modified to include additional language settings as described below.

At block 510, the multilingual query module 126 analyzes text of the intercepted query in a plurality of selected languages based on a language setting of a user interface application and a predetermined number of preferred languages of the client to produce results of analysis for each selected language. The results of analysis can include detected base forms for each language, among other results. In some examples, analyzing the text of the query in each language can include performing a morphological analysis on the intercepted query. For example, the base form of each word for each language can be analyzed, such that other forms of each word can be queried in each selected language. In some examples, additional languages can be added to the predetermined number of preferred languages if the multilingual query results are less than a threshold. For example, if the results at block 514 are limited, then additional selected languages can be analyzed. In some examples, the predetermined number of preferred languages can start at zero and increment by one for each subsequent query until the threshold number of results is reached. In some examples, each intercepted query can be analyzed and translated into a modified query with each language from the plurality of selected languages.

At block 512, the multilingual query module 126 generates a multilingual query based on results of analysis for the selected languages. In some examples, the multilingual query can be generated by joining the results of analysis for each selected language with an OR operator. For example, the modified queries can be joined together with an OR operator to form one multilingual query.

At block 514, the booster module 128 applies boost factors to results of the multilingual query based on the language scores of selected languages. For example, a predetermined amount of weight can be given to results of particular selected languages based on the language score for each selected language.

At block 516, the booster module 128 displays lists of multilingual query results in the selected languages. For example, the query results can be sorted by language. In some examples, the languages can be ranked according to language score. Each preferred language can have a language score calculated based on an amount of content produced in the language. In some examples, the ranking can also take into effect a relevancy score related to the search.

The process flow diagram of FIG. 5 is not intended to indicate that the operations of the computer-implemented method 500 are to be executed in any particular order, or that all of the operations of the computer-implemented method 500 are to be included in every case. Additionally, the computer-implemented method 500 can include any suitable number of additional operations.

The present techniques may be a system, a computer-implemented method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of computer-implemented methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
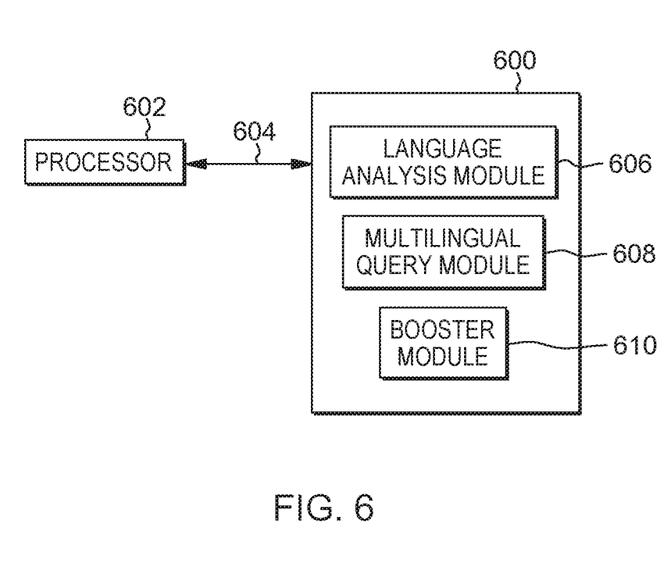
FIG. 6 is an example tangible, non-transitory computer-readable medium that can generate multilingual queries.

Referring now to FIG. 6, a block diagram is depicted of an example tangible, non-transitory computer-readable medium 600 that can generate multilingual queries. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the current computer-implemented method.

The various software components discussed herein may be stored on the tangible, non-transitory, computer-readable medium 600, as indicated in FIG. 6. For example, a language analysis module 606 includes code to monitor a client for language settings during user-generated content creation and detect one or more language settings. The language analysis module 606 also includes code to analyze user-created content to detect a language of a text of the user-generated content. The language analysis module 606 also includes code to compile a list of scored preferred languages for the client based on the detected language settings and the detected language from a text of the user-generated content. The language analysis module 606 can calculate a language score for each preferred language based on an amount of content produced in the preferred language. For example, if 52 articles were produced in Spanish and 26 articles were produced in English, then Spanish would have a higher language score than English. A multilingual query module 608 includes code to intercept a query from the client. The multilingual query module 608 also includes code to analyze a text of the intercepted query in a plurality of selected languages based on a language setting of a user interface application and a predetermined number of preferred languages of the client to produce results of analysis for each selected language. The multilingual query module 608 includes code to generate a multilingual query based on results of analysis for the selected languages. A booster module 610 includes code to display a list of multilingual query results in the selected languages. The booster module 610 also includes code to apply a boost factor to the results of the multilingual query based on scores of selected languages.

In some examples, the booster module 610 can sort the multilingual query results by language. The selected languages can be ranked by language score. The multilingual query module 608 can further include code to add additional languages to the predetermined number of preferred languages if the multilingual query results are less than a threshold in number. In some examples, the language analysis module 606 can include code to perform a morphological analysis on the intercepted query. In some examples, the multilingual query module 608 can include code to generate the multilingual query comprising by joining the results of analysis for each selected language with an OR operator.

The flowchart and block diagrams in the Figures illustrate the architecture, functionality, and operation of possible implementations of systems, computer-implemented methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for multilingual queries, a computer system comprising:
   one or more computer processors;
   one or more computer readable storage media;
   program instructions stored on the computer readable storage media for execution by at least one of the one or more computer processors, the program instructions comprising:
      program instructions to detect creation of content by a user prior to an Internet browser query;
      program instructions to detect one or more language settings during content creation by a user prior to an Internet browser query;
      program instructions to analyze the content to detect a language corresponding to text in the content;
      program instructions to compile a list of preferred languages based on the detected language settings and the detected language of the text in the content;
      program instructions to compile a list of scored preferred languages for the computing device based on the detected language settings and the detected language of the content;
      program instructions to subsequent to compiling a list of scored preferred languages, intercept a query from the client;
      program instructions to generate a multilingual query based on the one or more language settings, a detected language of the intercepted query, and the list of preferred languages; and
      program instructions to display a list of multilingual query results from the multilingual query.

2. The system of claim 1, the processor to further analyze text of the intercepted query in a plurality of selected languages based on a language setting of a user interface application, a detected language of the intercepted query, and a predetermined number of higher scored preferred languages of the client to produce results of analysis for each selected language.

3. The system of claim 2, wherein the selected languages are to include one or more of the preferred languages of the client if the query generated using the language setting of the user interface application and the detected query text language returns less than a threshold number of query results, the processor to generate a second multilingual query based upon the results of analysis for the additional selected languages.

4. The system of claim 1, the processor to further sort the results of the multilingual query by language, the languages to be ranked based on language score.

5. The system of claim 1, wherein the content comprises content signed by a user.

6. The system of claim 1, wherein the content comprises long content.

7. The system of claim 2, the processor to further apply boost factors to the multilingual query results based on the language scores of the selected languages.

8. A computer-implemented method, comprising:
   detecting, by one or more computer processors, creation of content by a user prior to an Internet browser query;
   detecting, by one or more computer processors, one or more language settings during content creation by a user prior to an Internet browser query;

analyzing, by one or more computer processors, the content to detect a language corresponding to text in the content;

compiling, by one or more computer processors, a list of preferred languages based on the detected language settings and the detected language of the text in the content;

compiling, by one or more computer processors, a list of scored preferred languages for the computing device based on the detected language settings and the detected language of the content;

subsequent to compiling a list of scored preferred languages, intercepting, by one or more computer processors, a query from the client;

generating, by one or more computer processors, a multilingual query based on the one or more language settings, a detected language of the intercepted query, and the list of preferred languages; and displaying, by one or more computer processors, a list of multilingual query results from the multilingual query.

9. The computer-implemented method of claim 8, further comprising displaying, via the processor, a list of multilingual query results in the selected languages, wherein each selected language has a language score calculated based on an amount of content produced in the selected language.

10. The computer-implemented method of claim 9, further comprising applying, via the processor, boost factors to the multilingual query results based on the language scores of the selected languages.

11. The computer-implemented method of claim 8, analyzing the text of the intercepted query comprising performing a morphological analysis on the intercepted query.

12. The computer-implemented method of claim 8, further comprising adding additional languages to the predetermined number of preferred languages if the multilingual query results are less than a threshold.

13. The computer-implemented method of claim 12, the predetermined number of preferred languages to start at zero and increment by one for each subsequent query until the threshold number of results is reached.

14. The computer-implemented method of claim 8, generating the multilingual query comprising joining the results of analysis for each selected language with an OR operator.

15. A computer program product for multilingual queries, a computer program product comprising:

program instructions stored on the computer readable storage media for execution by at least one of the one or more computer processors, the program instructions comprising:

program instructions to detect creation of content by a user prior to an Internet browser query;

program instructions to detect one or more language settings during content creation by a user prior to an Internet browser query;

program instructions to analyze the content to detect a language corresponding to text in the content;

program instructions to compile a list of preferred languages based on the detected language settings and the detected language of the text in the content;

program instructions to compile a list of scored preferred languages for the computing device based on the detected language settings and the detected language of the content;

program instructions to subsequent to compiling a list of scored preferred languages, intercept a query from the client;

program instructions to generate a multilingual query based on the one or more language settings, a detected language of the intercepted query, and the list of preferred languages; and program instructions to display a list of multilingual query results from the multilingual query.

16. The computer program product of claim 15, further comprising program code to apply a boost factor to the multilingual query results based on the language scores of the selected languages.

17. The computer program product of claim 15, further comprising program code to sort the multilingual query results by language, the languages to be ranked by language score.

18. The computer program product of claim 15, further comprising program code to add additional languages to the predetermined number of preferred languages if the multilingual query results are less than a threshold in number.

19. The computer program product of claim 15, further comprising program code to perform a morphological analysis on the intercepted query.

20. The computer program product of claim 15, further comprising program code to generate the multilingual query comprising by joining the results of analysis for each selected language with an OR operator.

* * * * *